(12) United States Patent
Moesle

(10) Patent No.: US 7,618,192 B2
(45) Date of Patent: Nov. 17, 2009

(54) BALL BEARING

(75) Inventor: Peter Moesle, Leutkirch (DE)

(73) Assignee: Myonic GmbH, Leutkirch (DE)

( * ) Notice: Subject to any disclaimer, the term of this patent is extended or adjusted under 35 U.S.C. 154(b) by 495 days.

(21) Appl. No.: 10/595,525

(22) PCT Filed: Oct. 15, 2004

(86) PCT No.: PCT/EP2004/011580

§ 371 (c)(1),
(2), (4) Date: Apr. 26, 2006

(87) PCT Pub. No.: WO2005/047719

PCT Pub. Date: May 26, 2005

(65) Prior Publication Data

US 2008/0279496 A1    Nov. 13, 2008

(30) Foreign Application Priority Data

Oct. 31, 2003 (DE) ................. 103 51 346

(51) Int. Cl.
F16C 33/44 (2006.01)
F16C 33/66 (2006.01)
(52) U.S. Cl. ..................... 384/470; 384/527
(58) Field of Classification Search ............... 384/470, 384/523, 527, 573
See application file for complete search history.

(56) References Cited

U.S. PATENT DOCUMENTS 3,733,110 A * 5/1973 Davis ......................... 384/520
3,744,862 A * 7/1973 Schwartz ..................... 384/527
3,790,239 A * 2/1974 Laux et al. ................... 384/463
4,073,552 A * 2/1978 Christy ....................... 384/470
4,541,739 A * 9/1985 Allen et al. .................. 384/470
5,560,103 A   10/1996 Harris et al.
5,918,986 A * 7/1999 Matsui et al. ................ 384/470

FOREIGN PATENT DOCUMENTS

| CH | 172 149 | 12/1934 |
| DE | 23 26 405 | 3/1973 |
| DE | 40 41 068 | 12/1990 |
| EP | 1 215 409 | 7/2001 |
| GB | 1215668 A * | 12/1970 |

OTHER PUBLICATIONS

DE-Z Antriebstechnik 10 (1971) Nr. 7A 35.
DE—Buch, Hansjurgen Sachtling, Kunststoff Taschenbuch, 22. Auglage 1983, S. 66, 67 37 bis 383.
Katalog TH66, SKF Gruppe, Miniatur-Kugellager C. 102.1, 1967.

* cited by examiner

Primary Examiner—Thomas R Hannon
(74) Attorney, Agent, or Firm—Notaro & Michalos P.C.

(57) ABSTRACT

The invention relates to a ball bearing with an inner race (2) and an outer race (1) disposed coaxially with respect to it, wherein between inner race (2) and outer race (1) bearing balls (6) are disposed which are guided by means of a cage (3), the cage (3) being comprised of a composite material. The invention addresses the problem of proposing a ball bearing, which combines a long service life with the properties of being capable of operating after a lubrication system failure. This is attained thereby that the composite material comprises epoxide resin as well as fibers.

10 Claims, 1 Drawing Sheet

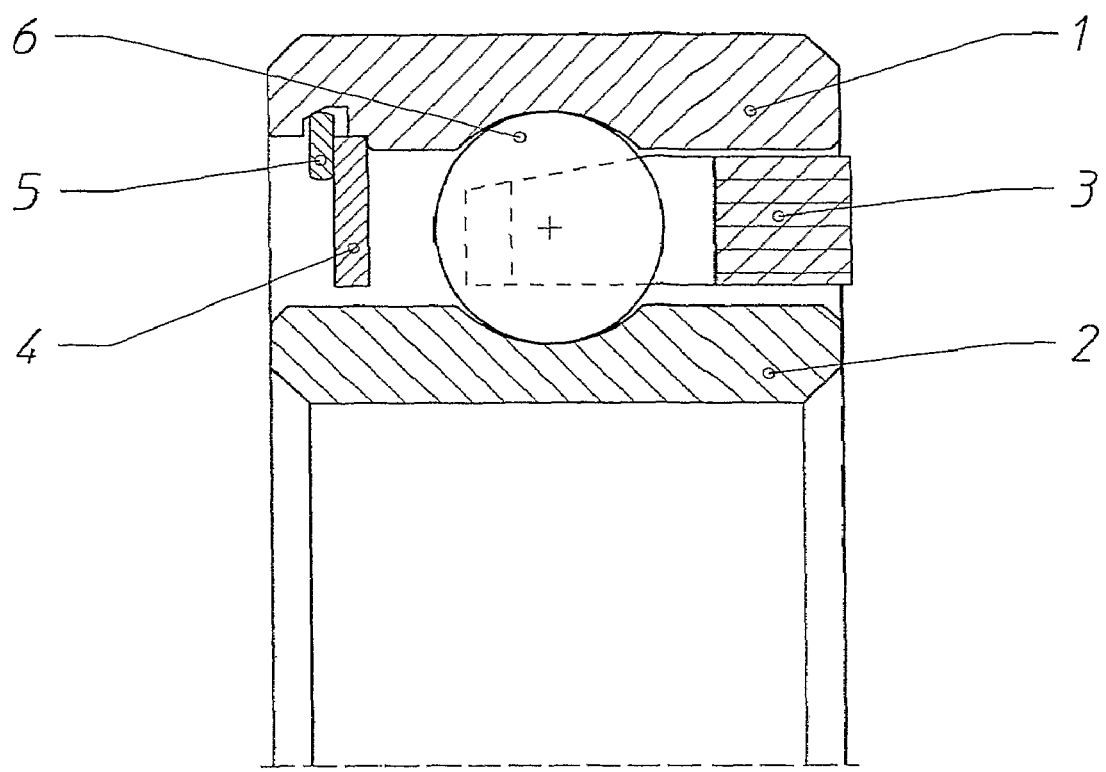

BALL BEARING

FIELD AND BACKGROUND OF THE INVENTION

The invention relates to a ball bearing with an inner race and an outer race disposed coaxially with respect to it, and between inner race and outer race bearing balls are disposed, which are guided by means of a cage, the cage being comprised of a composite material.

Such ball bearings have been and are currently employed in many areas of technology. In doing so, it has been found that in most cases the ball bearing cage is the structural element limiting the service life of the ball bearing. This can be explained by the fact that the cage is exposed to enormous force actions. It is alternately or simultaneously in contact with the rapidly rotating balls as well as with the inner race and/or the outer race, with the inner race and/or the outer race also rotating about a rotational axis. Especially at high rotational speeds of one of the races of approximately 500,000 rotations per minute, cages of conventional composite materials in the long run do not bear up under these loadings. Especially difficult is the use of conventional composite material in applications, in which the ball bearing is at least for a time exposed to increased temperatures, increased pressure and increased air humidity. In particular ball bearings in medical technology must be capable of resisting these conditions, since the devices with the ball bearings must frequently be autoclaved. For this process is specified a pressure of 1 bar, a temperature greater or equal to 134EC, as well as a saturated vapor atmosphere over a time period of approximately three minutes. Ball bearing cages of conventional composite material, such as phenolic resin in combination with cotton fibers, do not withstand these conditions at all or not for very long.

Disintegration processes occur, which result in the destruction of the entire ball bearing.

Ball bearing cages comprised of PEEK (polyether ether ketone) or PI (polyimide) or PAI (polyamide imide) have therefore been developed. However, ball bearing cages of one of these materials have the disadvantage that they do not have any properties which allow operation after lubrication system failure. In contrast to the known composite materials of phenolic resin and cotton fibers, the listed cage materials do not contain any fibers, such that no lubricant can be stored in the cage itself. This leads to the immediate destruction of the ball bearing if there is no more lubricant available in the ball bearing. However in such situations, ball bearing cages of phenolic resin and cotton fibers output small quantities of the stored lubricant to the running faces and/or to the balls, such that the service life of the ball bearing can be significantly extended. As already stated, ball bearings with a ball bearing cage of phenolic resin and cotton fibers have however the disadvantage that they only conditionally withstand the loadings to which a ball bearing, in particular in medical technology, is exposed.

The invention is based on the task of proposing a ball bearing which combines long service life with the properties of being capable of operating after a lubrication system failure.

SUMMARY OF THE INVENTION

The problem underlying the invention is solved thereby that the composite material comprises epoxide resin as well as fibers. It has been found that epoxide resins is capable of withstanding over a long time the extreme loadings to which a ball bearing cage is exposed. This is in particular important because, for example in medical technology, in particular in dental technology, the structural components in direct contact with the patient should be autoclaved after every use. During the autoclaving process these structural components, including the ball bearings, must withstand over a time period of several minutes temperatures of more than 134 EC, as well as a pressure of approximately 1 bar in saturated water vapor. The industry today demands that the structural components, and therewith the ball bearings, must be capable of withstanding more than 2000 autoclaving cycles. These requirements are only satisfied by a ball bearing cage of composite material which comprises epoxide resin as well as fibers. The fiber content ensures the operation of the ball bearing cage after lubrication system 3 failure. Should the lubricant in the ball bearing run low, the fibers comprised in the epoxide resin output stored lubricant, which they had initially taken up or absorbed, to the running faces and/or to the balls. The ball bearing with a ball bearing cage of epoxide resin as well as fibers assures a long service life as well as the properties required for operation after lubricant system failure. The ball bearing cage can be developed for example as a crown or a comb or a solid cage.

In order for the ball bearings according to the invention to meet also the medical technology requirements, it is advantageously provided that the epoxide resin is temperature resistant at a temperature higher than 130EC, in particular at a temperature higher than or equal to 134EC, and/or that the epoxide resin is pressure resistant, in particular at pressures about or higher than 1 bar and/or that the epoxide resin is moisture resistant, in particular resistant under a saturated vapor atmosphere. These temperatures, pressures and moisture contents in combination occur during autoclave processes. For this purpose preferably heat-cured epoxide resins are utilized. It is furthermore of great advantage if the fibers also withstand these temperatures, pressures and moisture contents. It is therein required that the epoxide resin as well as the fibers withstand the temperatures, pressures and moisture contents over a time period of several minutes, in particular of approximately three minutes. The composite material must endure approximately 2000 autoclave cycles. Decisive is that the composite material is capable of withstanding the sudden parameter changes through the hot water vapor bursting into the autoclave. It is understood that it is also within the scope of the invention that the composite material withstand the listed parameters in any combination or individual parameters alone.

In order to ensure an especially long service life, a further development of the invention provides that the composite material is comprised entirely of epoxide resin as well as fibers. Hereby the use of materials with lower service life is avoided.

It is advantageously provided that the fibers are natural fibers and/or synthetic fibers. Natural fibers to be considered for use are for example fibers of plant origin, such as cotton or fibers of animal origin, such as wool. Cotton has the advantage that it is a highly temperature-resistant material. Synthetic fibers to be considered are for example polyamide fibers, since, apart from high temperature resistance, these also have high pressure and moisture resistance. The fibers serve the purpose of taking up or absorbing and storing lubricant which can later be released in the event of lubrication system failure.

To increase the toughness of the ball bearing cage, it is advantageously provided that the fibers are implemented as a carrier material, in particular a strip-shaped carrier material, for the epoxide resin. The carrier material is distinguished thereby that the fibers are connected with one another. The carrier material is impregnated with epoxide resin during the manufacturing process and wound onto a heated mandrel. The mandrel is thereupon removed and the tube remaining is cured under pressure and increased temperatures. Due to the fiber composite, the ball bearing cage gains an especially good toughness.

The carrier material is advantageously implemented as structured fabric, in particular as a woven cloth. This fabric can be particularly well worked during the production of the ball bearing cages, since it is especially tearproof.

An especially good bonding of the fibers with the epoxide resin is attained thereby that the carrier material is implemented as a fibrous web. Fibrous webs have an especially large reactive surface since fibrous webs are comprised of aligned or randomly oriented fibers, which are connected with one another through friction and/or cohesion and/or adhesion. By using fibrous webs as the carrier material, an especially good connection of the carrier material strip is attained during the process of winding it onto the heated mandrel. Detachments of individual wound layers are advantageously avoided.

In order for the properties of the ball bearing cage of being capable of operating after lubrication system failure to be given from the outset, the cage is filled with lubricant. The ball bearing cage is therein exposed to a vacuum, such that the lubricant penetrates especially rapidly into the cage. If one were to rely on capillary forces alone, the property of being capable of operating after a lubrication system failure would not be given from the outset.

The use of the ball bearing cages comprised of epoxide resin as well as fibers is especially of interest in miniature ball bearings, which have an outer diameter of less than or equal to 30 millimeters. These are most often ball bearings which are exposed to enormous rotational speed loadings. The ball bearings according to the invention are in particular suitable for use in medical technology, in particular in dental technology, since in these fields extreme loadings must be tolerated. Rotational speeds of one of the races of approximately 500,000 rotations per minute and more are not rare occurrences.

The invention will be described in detail in conjunction with the sole FIGURE which depicts an embodiment example of the invention.

BRIEF DESCRIPTION OF THE DRAWINGS

FIG. 1 shows a section through a ball bearing.

DETAILED DESCRIPTION OF THE INVENTION

Between outer race 1 and inner race 2, disposed coaxially with respect to it, are disposed bearing balls 6, which are guided by means of the ball bearing cage 3 and held spaced apart from one another. At the lower end of the figure the rotational axis is indicated. In this embodiment example the ball bearing cage 3 is developed as a crown cage. It is understood that developing the cage 3 as a solid cage is also possible. On the left side of the ball bearing a retaining ring 5 is provided, with a cover disk 4 disposed next to it.

The ball bearing cage 3 is entirely comprised of composite material comprising epoxide resin and synthetic fibers arranged as a fibrous web. If it is assumed that the outer race is fixed and the inner race 2 rotates at a rotational speed of 500,000 rotations per minute, then the balls 6 rotate about their own axis at a rotational speed of approximately 1,000,000 rotations per minute (factor 2), with the ball bearing cage 3 rotating about the rotational axis at a rotational speed of approximately 200,000 rotations per minute (factor 0.4). Onto the ball bearing cage 3 act enormous forces since it is continuously in contact with the rapidly rotating balls 6, the fixed outer race 1, as well as the rapidly rotating inner race 2. The ball bearing cage 3 comprised of epoxide resin as well as fibers is able to withstand these loadings and, if it is needed, outputs through the fibers lubricant to the balls and/or the outer race 1 or the inner race 2. Due to these so-called properties of being capable of operating after a lubrication system failure, the service life of the entire ball bearing is significantly increased.

LIST OF REFERENCE NUMBERS 1 outer race
2 inner race
3 ball bearing cage
4 cover disk
5 retaining ring
6 balls

The invention claimed is:

1. A ball bearing for use in medical and dental applications comprising:
   an inner race and an outer race coaxial with the inner said outer race having a bottom surface on which is provided a groove for accommodating a retaining ring and a cover disk, said retaining ring having an inner side and an outer side and said cover disk being positioned adjacent said inner side of said retaining ring;
   bearing balls disposed between said inner race and said outer race; and
   a cage comprising a composite material of heat cured epoxide resin as well as fibers which are implemented as a carrier material for the epoxide resin, the fibers being filled with lubricant;
   wherein said bearing balls are guided by said cage, and wherein one of said inner race and said outer races rotates at a rate of about 500,000 rotations per minute, and wherein said ball bearing has an outer diameter of 30 mm or less.

2. A ball bearing as claimed in claim 1, wherein the epoxide resin is temperature resistant at temperatures higher than or equal to 134° C., and is pressure resistant, at pressures above 1 bar, and wherein the epoxide resin is moisture resistant, under a saturated vapor atmosphere.

3. A ball bearing as claimed in claim 1, wherein the composite material is entirely comprised of epoxide resin as well as fibers.

4. A ball bearing as claimed in claim 1, wherein the fibers are natural fibers and/or synthetic fibers.

5. A ball bearing as claimed in claim 1, wherein the fibers are developed as a strip-shaped carrier material, for the epoxide resin.

6. A ball bearing as claimed in claim 5, wherein the carrier material is implemented as a structured cloth fabric.

7. A ball bearing as claimed in claim 1, wherein the carrier material is developed as a fibrous web.

8. A ball bearing as claimed in claim 1, wherein said ball bearing has an outer diameter between 6 mm and 12 mm.

9. A ball bearing as claimed in claim 1, wherein said cage is one of a crown cage, a comb cage and a solid cage.

10. A ball bearing as claimed in claim 1, wherein said ball bearing can withstand a minimum of 2000 autoclaving cycles.

* * * * *